(12) United States Patent
Shitano (10) Patent No.: US 9,052,989 B2
(45) Date of Patent: Jun. 9, 2015

(54) STORAGE CONTROL APPARATUS AND STORAGE METHOD THEREFOR

(71) Applicant: CANON KABUSHIKI KAISHA, Tokyo (JP)

(72) Inventor: Masaki Shitano, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 219 days.

(21) Appl. No.: 13/681,116

(22) Filed: Nov. 19, 2012

(65) Prior Publication Data

US 2013/0151772 A1     Jun. 13, 2013

(30) Foreign Application Priority Data

Dec. 7, 2011  (JP) ................................ 2011-268367

(51) Int. Cl.
| | |
|---|---|
| *G06F 12/00* | (2006.01) |
| *G06F 3/06* | (2006.01) |
| *G06F 11/14* | (2006.01) |
| *G06F 13/38* | (2006.01) |
| *G06F 13/00* | (2006.01) |

(52) U.S. Cl.
CPC .............. *G06F 12/00* (2013.01); *G06F 3/0631* (2013.01); *G06F 3/0647* (2013.01); *G06F 11/1456* (2013.01); *G06F 13/385* (2013.01); *G06F 11/1448* (2013.01); *G06F 13/00* (2013.01); *G06F 3/0607* (2013.01); *G06F 3/0632* (2013.01); *G06F 3/0688* (2013.01)

(58) Field of Classification Search
None
See application file for complete search history.

(56) References Cited

U.S. PATENT DOCUMENTS 8,037,022 B2    10/2011  Rahman
2012/0042138 A1*  2/2012  Eguchi et al. ................. 711/154

FOREIGN PATENT DOCUMENTS

JP       2010-529550        8/2010

OTHER PUBLICATIONS

UPnP-cs-ContentSync-v1-Service-20090714, Jul. 14, 2009.
UPnP-av-ContentDirectory-v2-Service-20060531, May 31, 2006.

* cited by examiner

*Primary Examiner* — Midys Rojas
(74) *Attorney, Agent, or Firm* — Fitzpatrick, Cella, Harper & Scinto (57) ABSTRACT

A storage control apparatus which connects a portable storage medium and stores content data acquired from the portable storage medium in a storage unit communicates with another apparatus to set the correspondence between a storage location within the portable storage medium and that within the storage unit. The storage control apparatus acquires, among content data within the portable storage medium, content data to be stored in the storage unit, and stores the content data acquired from the portable storage medium by the acquisition unit in a storage location within the storage unit corresponding to that within the portable storage medium, in which the acquired content data is stored, based on the correspondence between the storage location within the portable storage medium and that within the storage unit.

24 Claims, 5 Drawing Sheets

| CDS_URI | DCF | TRANSFER FLAG |
|---|---|---|
| http://172.23.20.11/contensts/image1.jpg | DCIM/100Cano/00000001.jpg | 1 |
| http://172.23.20.11/contensts/image2.jpg | DCIM/100Cano/00000002.jpg | 0 |
| http://172.23.20.11/contensts/image3.jpg | DCIM/100Cano/00000003.jpg | 0 |
| http://172.23.20.11/contensts/image4.jpg | DCIM/100Cano/00000004.jpg | 1 |
| http://172.23.20.11/contensts/image5.jpg | DCIM/100Cano/00000005.jpg | 0 |
| http://172.23.20.11/contensts/image6.jpg | DCIM/100Cano/00000006.jpg | 1 |
| http://172.23.20.11/contensts/image7.jpg | DCIM/100Cano/00000007.jpg | 1 |

FIG. 6

STORAGE CONTROL APPARATUS AND STORAGE METHOD THEREFOR

BACKGROUND OF THE INVENTION

1. Field of the Invention

The present invention relates to an apparatus and method for controlling storage of contents.

2. Description of the Related Art

In recent years, not only personal computers but also various devices such as cellular phones and home electric appliances can connect to networks. Environments in which home electric appliances and the like are used in cooperation extend not only to office use but also to home use since home electric appliances and other electric appliances which are solely used so far are connected to networks.

An example of network techniques that can implement such environments is Universal Plug and Play (to be referred to as UPnP hereinafter). UPnP enables "plug and play" for a device connected to a network (to be simply referred to as a device hereinafter) while it does not require installation of driver software and the like. Furthermore, UPnP is independent of the type of OS (Operating System) operating on each device.

Using UPnP automates operations, by the device, of joining a network and dynamically acquiring an IP address, sending a notification about its own function, and acquiring information about the presence of other devices and their functions.

This enables a device such as a cellular phone or television connected to a network to automatically view, via the network, contents, moving images, still images, and the like held in another device such as a digital camera without user settings.

It is also possible to save still images, moving images, and the like captured by a digital camera or the like in a PC or network storage connected to a network, and synchronize the still images, the moving images and the like between the digital camera and the network storage.

With the above technique, a device such as a digital camera incorporating a UPnP function establishes network connection with a control point for controlling a third party UPnP device via a wired or wireless LAN, thereby forming a system. When the content sync (synchronization) service of UPnP is used, consistency of synchronization of contents cannot be maintained if the contents are moved by pulling out the storage of the digital camera and directly inserting it into the network storage or the like. A similar problem may arise even when the content sync service of UPnP is not used if the contents are moved by putting out the storage of the digital camera and directly inserting it into the network storage or the like.

SUMMARY OF THE INVENTION

According to one aspect of the present invention, there is provided a storage control apparatus for storing content data acquired from a portable storage medium in a storage unit, comprising: a communication unit which communicates with another apparatus to set a correspondence between a storage location within the portable storage medium and a storage location within the storage unit; a connection unit which connects the portable storage medium; an acquisition unit which acquires, among content data within the portable storage medium, content data to be stored in the storage unit; and a storage control unit which stores the content data acquired from the portable storage medium by the acquisition unit in a storage location within the storage unit corresponding to a storage location within the portable storage medium, in which the acquired content data is stored, based on the correspondence between the storage location within the portable storage medium and the storage location within the storage unit.

According to another aspect of the present invention, there is provided a storage method for a storage control apparatus to which a portable storage medium is connectable, and which stores content data acquired from the portable storage medium in a storage unit, the method comprising: a communication step of communicating with another apparatus to set a correspondence between a storage location within the portable storage medium and a storage location within the storage unit; an acquisition step of acquiring, among content data within the portable storage medium, content data to be stored in the storage unit; and a storage control step of storing the content data acquired from the portable storage medium in the acquisition step in a storage location within the storage unit corresponding to a storage location within the portable storage medium, in which the acquired content data is stored, based on the correspondence between the storage location within the portable storage medium and the storage location within the storage unit.

Further features of the present invention will become apparent from the following description of exemplary embodiments with reference to the attached drawings.

DESCRIPTION OF THE EMBODIMENTS

An embodiment of the present invention will be described below with reference to the accompanying drawings. Note that the embodiment to be explained below provides an example when the present invention is practically implemented, and is a practical example of an arrangement defined in the appended claims.

In the embodiment to be described below, an example of a technique of synchronizing content data between UPnP devices each of which provides a content directory service will be explained. In the example, a system including a network storage 101 as a UPnP device and a digital camera 100 as a UPnP device will be described. Note that the present invention is not limited to a device using UPnP, and is applicable to an apparatus for performing communication according to another protocol.

<Configuration of System>

Figure 1:
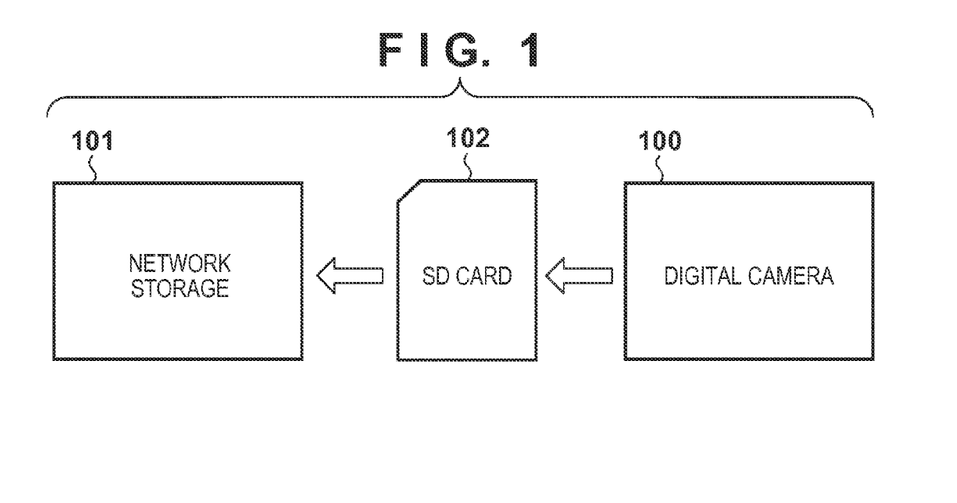
FIG. 1 is a view showing the configuration of a system.

The configuration of a system according to the embodiment will be described with reference to FIG. 1. As shown in FIG. 1, the system according to the embodiment includes the network storage 101 and digital camera 100. The above-described synchronization processing is generally performed among a plurality of UPnP devices. In the example, however, synchronization between two UPnP devices will be described. This description, therefore, applies to each of pairs of the plurality of UPnP devices.

The network storage 101 and digital camera 100 have an arrangement in which they can communicate with each other via a network such as a wired LAN or wireless LAN. An SD card 102 (SD Memory Card) can be inserted into (mounted on) the network storage 101 or digital camera 100. If the SD card 102 is inserted, the network storage 101 or digital camera 100 can read/write various kinds of information from/in the SD card 102.

The SD card 102 is an example of a portable storage medium detachable from the network storage 101 or digital camera 100, and is used to hold various kinds of information recorded by the network storage 101 or digital camera 100. Note that any portable storage medium other than the SD card 102, which is detachable from the network storage 101 or digital camera 100 and for which the network storage 101 or digital camera 100 can perform read/write operations, may be used. For example, a portable storage medium such as a CF (Compact Flash®) card or USB memory used for home electric appliances, cellular phones, PCs, and the like may be used. The present invention is not limited to the network storage or digital camera, and is applicable to an apparatus which can read/write information from/in a portable storage medium such as an SD card.

<Network Storage (Information Processing Apparatus) 101>

Figure 2:
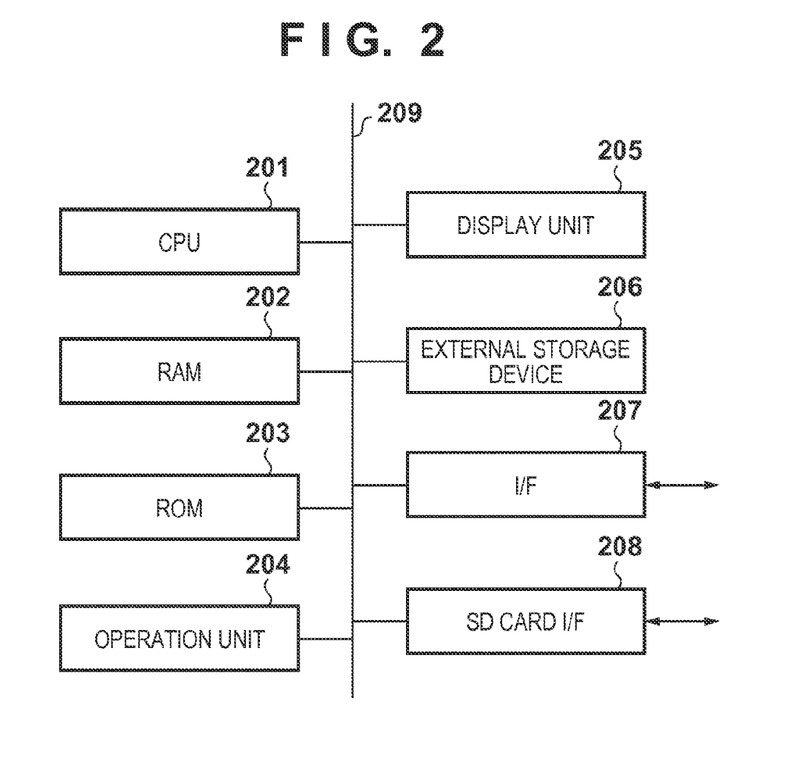
FIG. 2 is a block diagram showing an example of the hardware arrangement of a network storage 101.

An example of the hardware arrangement of the network storage 101 will be described next with reference to a block diagram shown in FIG. 2. Note that the arrangement shown in FIG. 2 is merely an example, and another arrangement may be adopted as long as it can implement various processes to be described later as processes performed by the network storage 101.

A CPU 201 controls the overall operation of the network storage 101 using computer programs and data stored in a RAM 202 and ROM 203, and performs each process to be described later as a process performed by the network storage 101.

The RAM 202 has an area for temporarily storing various data received from an external apparatus such as the digital camera 100 via an I/F (interface) 207. The RAM 202 also has an area for temporarily storing various kinds of information read out, by the CPU 201, from the SD card 102 connected with an SD card I/F 208. Furthermore, the RAM 202 has a work area which is used by the CPU 201 to perform various processes. That is, the RAM 202 can provide various areas as needed. The ROM 203 stores the boot program and setting data of the network storage 101.

An operation unit 204 includes a mouse and keyboard. The user can input various instructions to the CPU 201 by operating the operation unit 204. For example, by operating the operation unit 204, it is possible to input an instruction to register content data in an external storage device 206, and input, to the CPU 201, an instruction to delete or edit content data stored in the external storage device 206. A display unit 205 includes a CRT or liquid crystal screen, and can display a processing result by the CPU 201 with images and characters. Note that the display unit 205 may be a touch panel screen. In this case, the display unit 205 implements part of the function of the operation unit 204.

The external storage device 206 is a mass information storage device represented by a hard disk drive device. The external storage device 206 saves an OS (Operating System), and computer programs, data, and the like for causing the CPU 201 to implement each process to be described later as a process performed by the network storage 101. The external storage device 206 also saves content data and various kinds of information (to be described later). The computer programs and various kinds of information saved in the external storage device 206 are loaded into the RAM 202 as needed under the control of the CPU 201 to be processed by the CPU 201.

The I/F 207 serves as a network interface for communicating data with the digital camera 100 via the network.

The SD card I/F 208 is configured so that the SD card 102 is detachable. When the CPU 201 detects that the SD card 102 has been inserted into the SD card I/F 208, it reads/writes information from/in the SD card 102 via the SD card I/F 208. Reference numeral 209 denotes a bus for connecting the above-described components with each other.

In the embodiment, a captured image is used as an example of content data. Even if, however, audio data or a moving image is used as content data, the following description can be equally applied practically.

<Digital Camera 100>

Figure 3:
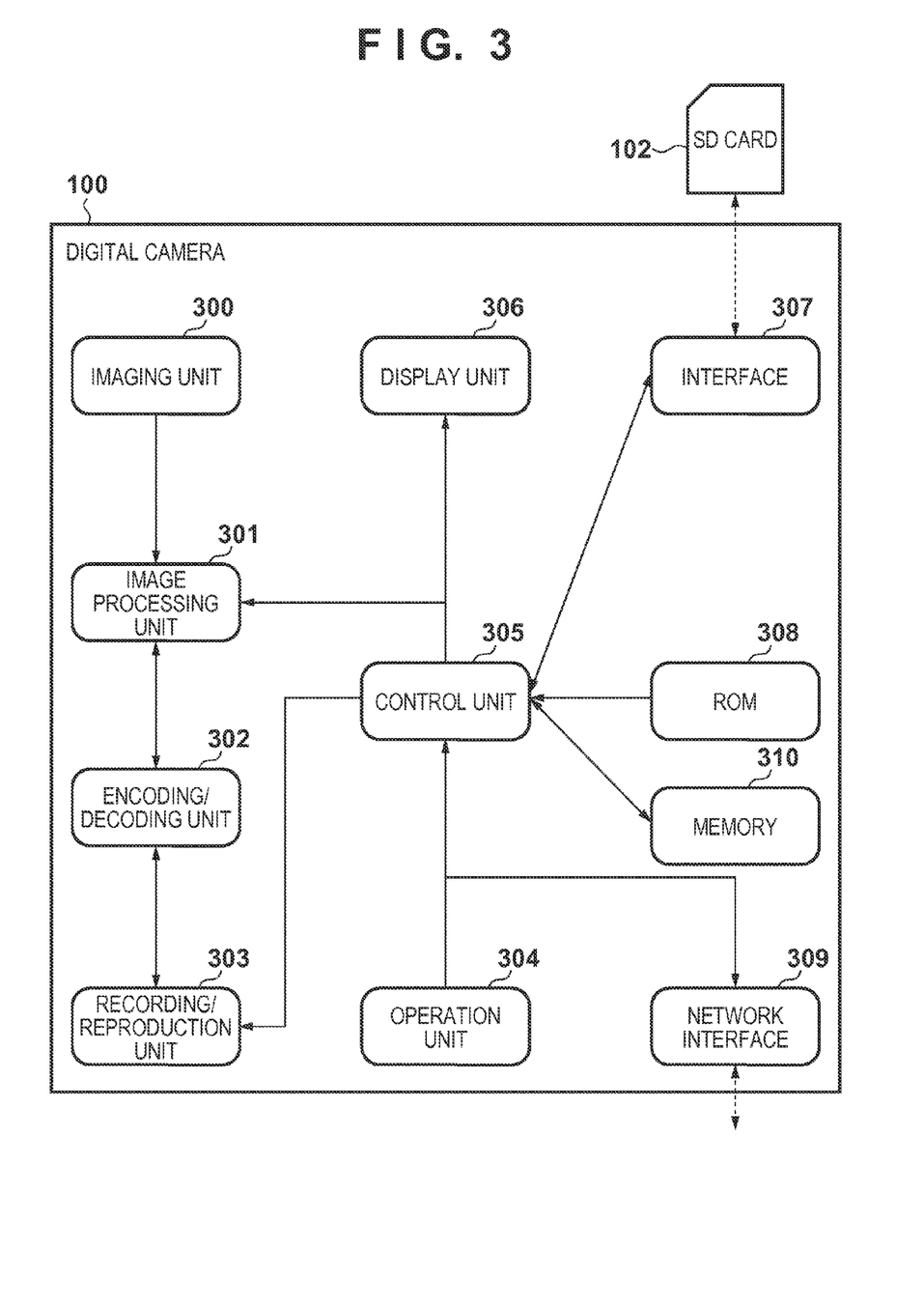
FIG. 3 is a block diagram showing an example of the arrangement of a digital camera 100.

An example of the arrangement of the digital camera 100 will be described with reference to a block diagram shown in FIG. 3. Note that the arrangement shown in FIG. 3 is merely an example, and another arrangement may be adopted as long as it can implement various processes to be described later as processes performed by the digital camera 100.

An imaging unit 300 captures the optical image of an external world to acquire a captured image. An image processing unit 301 performs various image processes for the captured image received from the imaging unit 300 or a captured image received from an encoding/decoding unit 302 to generate a captured image in a predetermined format.

The encoding/decoding unit 302 encodes (for example, performs variable length coding after DCT and quantization) the captured image generated by the image processing unit 301, and sends the thus obtained data as encoded image data to a recording/reproduction unit 303. Furthermore, the encoding/decoding unit 302 decodes encoded image data sent from the recording/reproduction unit 303, and sends the thus decoded captured image to the image processing unit 301.

The recording/reproduction unit 303 stores the encoded image data received from the encoding/decoding unit 302 in a memory 310 within the digital camera 100, or in the SD card 102 if it is connected with an interface 307. The recording/reproduction unit 303 also reads out encoded image data stored in the SD card 102 or memory 310 to supply it to the encoding/decoding unit 302. In the following description, the encoded image data may be simply referred to as a captured image.

A display unit 306 includes an EVF (Electric View Finder) and liquid crystal panel, and displays a captured image having undergone image processing by the image processing unit 301, image capturing settings, or a setting screen. Note that the display unit 306 may be a touch panel screen. In this case, the display unit 306 implements part of the function of an operation unit 304.

The operation unit 304 includes a shutter button, cursor button, enter button, and cancel button. The user can input various instructions to a control unit 305 by operating the operation unit 304.

The interface 307 is configured so that the SD card 102 is detachable. When the control unit 305 detects that the SD card 102 has been inserted into the interface 307, it reads/writes information from/in the SD card 102 via the interface 307.

A ROM 308 stores various setting data for the digital camera 100, and computer programs and data for causing the control unit 305 to perform various processes to be described later as processes performed by the digital camera 100. A network interface 309 serves as an interface for communicating data with the network storage 101 via the network.

The control unit 305 controls the overall operation of the digital camera 100 using the computer programs and data stored in the ROM 308 and memory 310, and performs each process to be described later as a process performed by the digital camera 100.

<Configuration of Content Synchronization Module>

Figure 4:
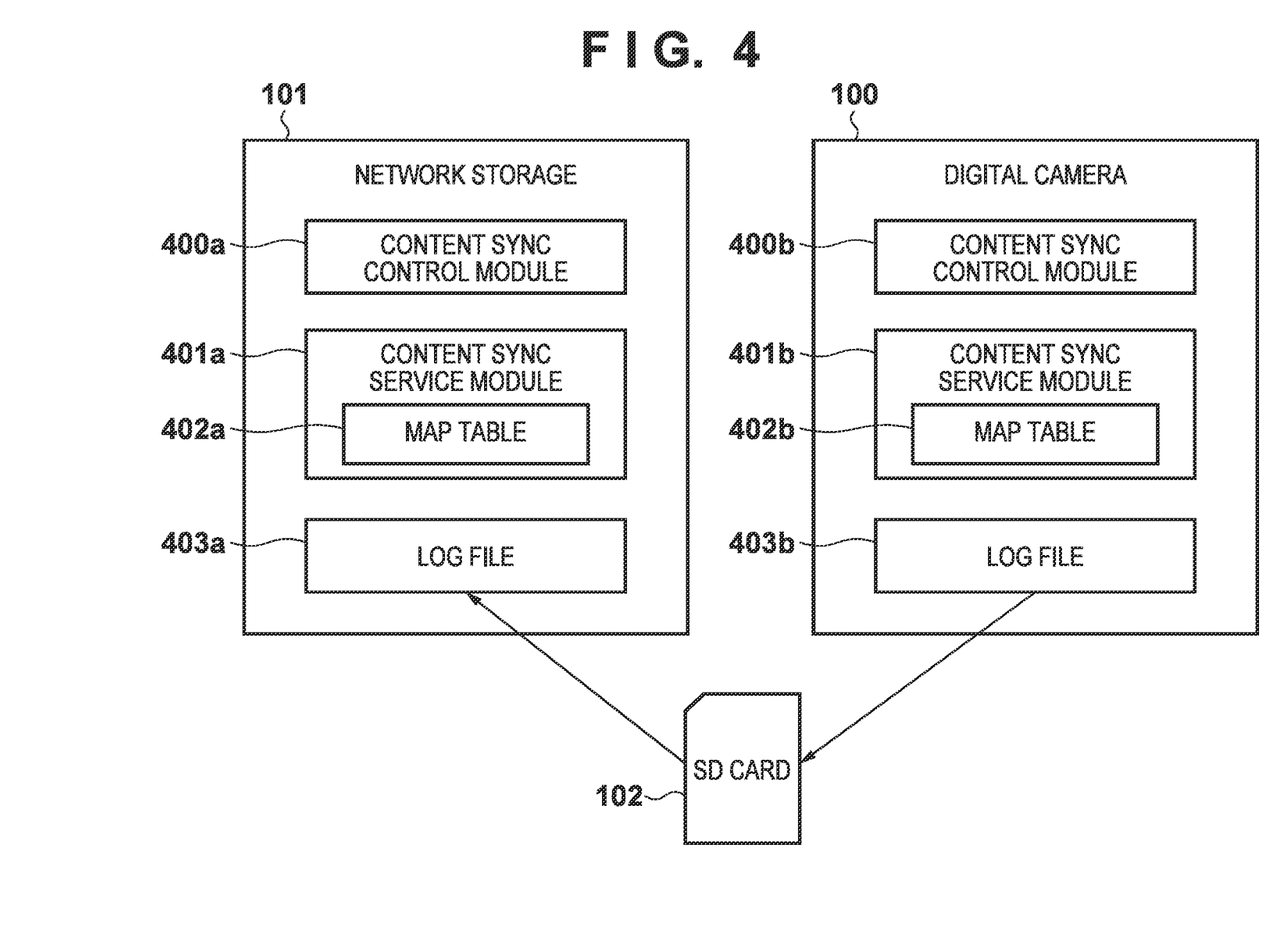
FIG. 4 is a block diagram showing an example of the configuration of modules and data (files)

FIG. 4 shows an example of the configuration of modules and data (files) stored in the network storage 101 and digital camera 100 for performing content synchronization processing between the network storage 101 and the digital camera 100.

Note that in FIG. 4, the modules and data (files) within the network storage 101 are saved in the external storage device 206 of the network storage 101. The modules and data (files) within the digital camera 100 are stored in the ROM 308 and memory 310 of the digital camera 100. The CPU 201 performs the modules within the network storage 101, and the control unit 305 performs the modules within the digital camera 100.

A content sync (content synchronization) control module 400a or 400b establishes the correspondence as a function of the UPnP content sync service. Establishing the correspondence indicates processing of associating devices (the digital camera 100 and network storage 101 in the embodiment) between which contents are synchronized, and folders (directories) to be synchronized.

If, for example, communication between the network storage 101 and the digital camera 100 via the network is established, the content sync control module 400b recognizes that the communication partner is the network storage 101. The content sync control module 400b sets to associate a folder or file saved in the SD card 102 connected with the interface 307 or the memory 310 within the digital camera 100 with a folder or file saved in the external storage device 206. The content sync control module 400b then saves information indicating the correspondence between the folders or files in the memory 310 within the digital camera 100. Note that if the SD card 102 is connected with the interface 307, the information indicating the correspondence is also saved in the SD card 102.

The operation of the content sync control module 400a is basically the same as that of the module 400b, and the processing performed by the content sync control module 400b is only performed on the network storage 101 side.

When the content sync control module 400a (400b) detects the connection of the SD card 102 with the network storage 101 (digital camera 100), it instructs a content sync service module 401a (401b) to start content data synchronization.

Assume that the user adds a new captured image to the connected SD card 102 or the memory 310 by capturing an image using the digital camera 100, deletes a captured image from the SD card 102 or memory 310, or edits a captured image or information about it within the SD card 102 or memory 310. In this case, the content sync service module 401b records, in a log file 403b, information (log information) indicating details of the change made by the changing operation in the SD card 102 or memory 310. That is, the content sync service module 401b records, as log information, in the log file 403b, how the directory structure of the digital camera 100 has been changed. Note that the log file 403b is recorded in the memory 310 and SD card 102.

Figure 5:
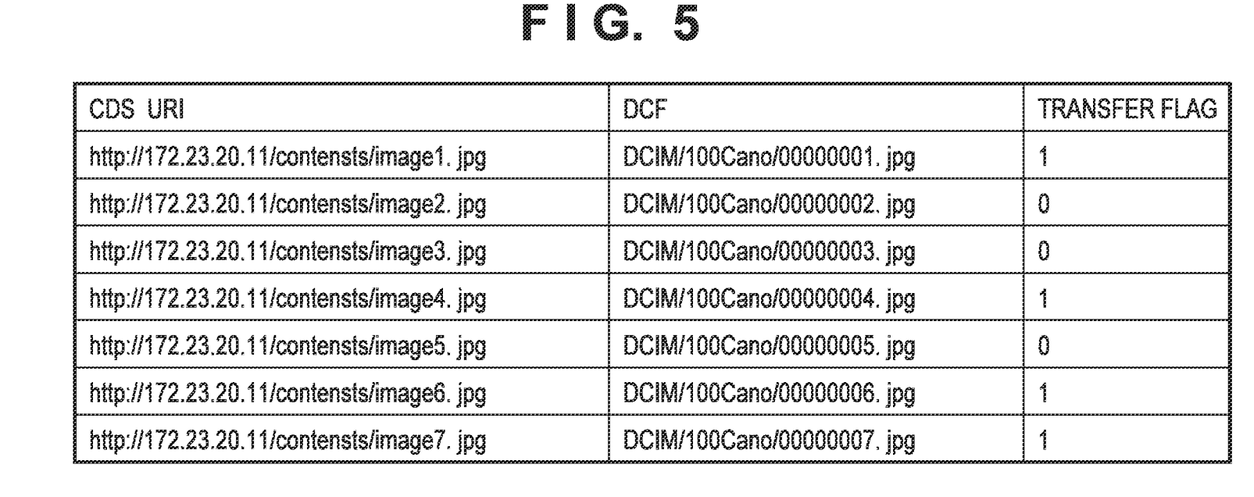
FIG. 5 is a table showing an example of the structure of a map table 402a (402b)

Furthermore, the content sync service module 401a (401b) manages a map table 402a (402b) having a structure exemplified in FIG. 5. Note that the structure of the map table 402a (402b) is not limited to that shown in FIG. 5, and any structure may be adopted as long as it can implement the function of the map table 402a (402b) to be described below.

A CDS URL serves as an address to be used to access a captured image from outside the apparatus via the network. The digital camera 100 or network storage 101 provides a content directory service (CDS). The CDS URL serves as an address used when the service makes the captured image public outside the digital camera 100 or network storage 101. A DCF serves as a path indicating a position where the captured image is stored. Note that in FIG. 5, DCIM indicates the root folder of the storage medium (SD card). A transfer flag indicates whether the captured image has been provided to an external apparatus: 1 indicates that the image has been provided and 0 indicates that the image has not been provided yet.

If, for example, the imaging unit 300 captures a new image, the content sync service module 401b stores the new captured image in the memory 310 within the digital camera 100. If the SD card 102 is connected with the interface 307, the module 401b also records the captured image in the SD card 102. The content sync service module 401b then sets the path (DCF) of the captured image recorded in the SD card 102, the CDS URL of the captured image, and the transfer flag (its value is 0) to register them in the map table 402b. Note that if a given captured image is deleted on the digital camera 100 side, the CDS URL, DCF, and transfer flag of the captured image are also deleted from the map table 402b. The content sync service module 401b records the map table 402b in the SD card 102 together with the log file 403b. This also applies to the content sync service module 401a.

If such an SD card 102 is connected with the SD card I/F 208 of the network storage 101, the content sync service module 401a refers to the log file 403b recorded in the SD card 102. The content sync service module 401a reflects "the directory structure changed on the digital camera 100 side" recorded in the log file 403b on the directory structure of the external storage device 206 of the network storage 101. This enables the content sync service module 401a to reconfigure the directory structure of the external storage device 206 in the network storage 101 to be the same as that of the memory 310 or SD card 102 within the digital camera 100. The SD card 102 is a portable storage medium recording content data stored by the digital camera 100 and a directory structure in which the content data is stored. When it is detected that the SD card 102 has been inserted, the content sync service module 401a creates the same directory structure as that recorded in the SD card 102 within the external storage device 206 of the network storage 101.

Furthermore, the content sync service module 401a reads out the log file 403b recorded in the SD card 102, and reflects it on the log file 403a.

The content sync service module 401a refers to the map table 402b recorded in the SD card 102. The content sync service module 401a then refers to the value of the transfer flag registered in the map table 402b, and also refers to a DCF corresponding to a transfer flag with a value of 0, thereby reading out a captured image from the position indicated by the DCF in the SD card 102.

The content sync service module 401a specifies a storage folder associated with "a storage folder in which the digital camera 100 stores the readout captured image" in the directory structure of the external storage device 206 of the network storage 101. The content sync service module 401a registers the readout captured image in the specified storage folder of the external storage device 206.

<Processing Performed by Network Storage 101 and Digital Camera 100>

Figure 6:
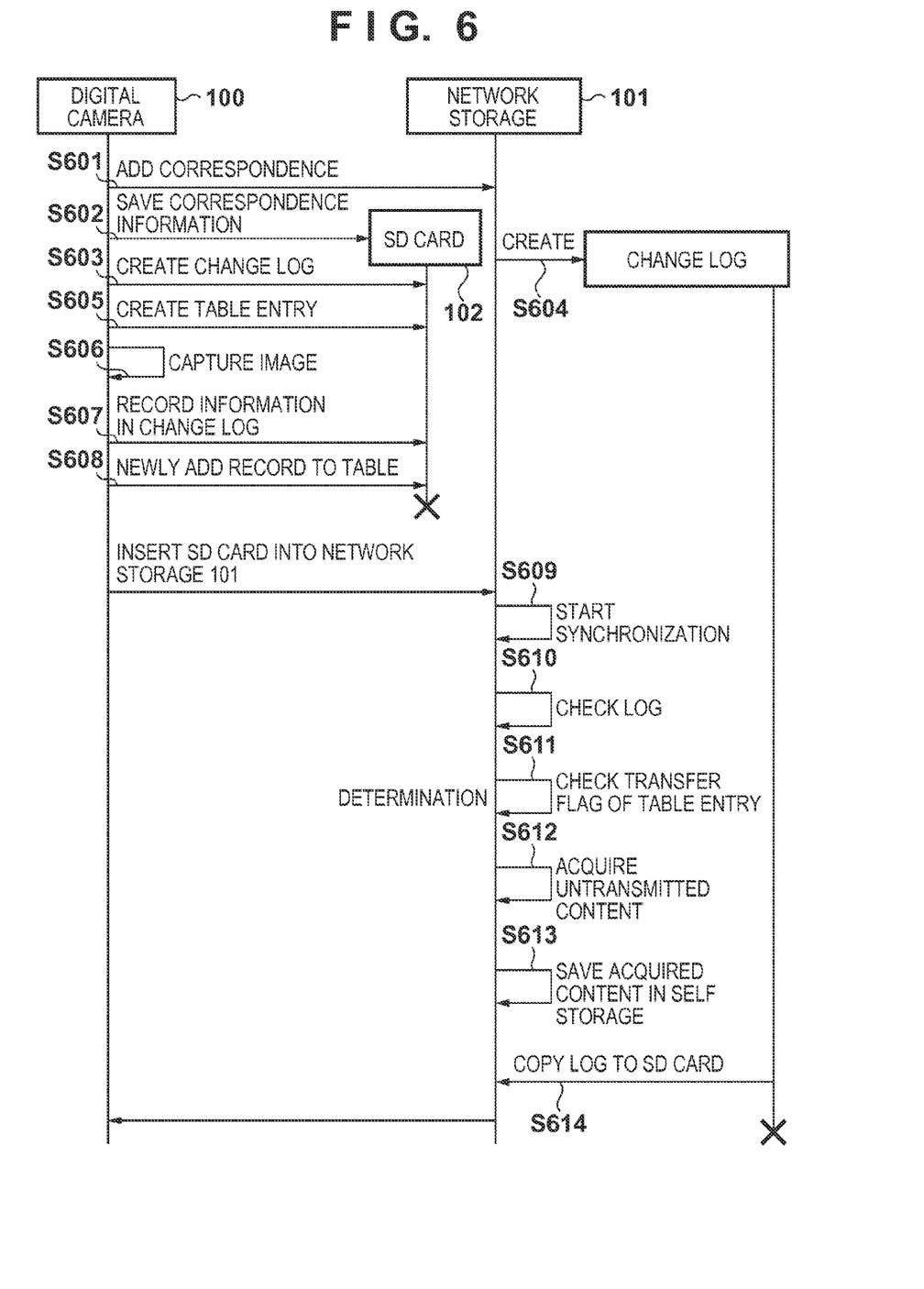
FIG. 6 is a flowchart illustrating processing by the network storage 101 and digital camera 100.

Processing performed by the network storage 101 and digital camera 100 will now be described with reference to FIG. 6 showing a flowchart of the processing.

In step S601, the content sync control module 400b of the digital camera 100 recognizes that the communication partner is the network storage 101, and establishes communication with the network storage 101. The content sync control module 400b sets to associate a folder or file saved in the SD card 102 of the digital camera 100 with a folder or file saved in the external storage device 206. The content sync control module 400b then saves information indicating the correspondence between the folders or files in the memory 310 within the digital camera 100.

Assume in the following description that the SD card 102 is connected with the interface 307 at this time. In step S602, therefore, the content sync control module 400b also saves the information indicating the correspondence in the SD card 102.

In step S603, the content sync service module 401b creates a log file 403b in each of the SD card 102 and memory 310 within the digital camera 100. At this time, the log file 403b records nothing.

When communication is established and setting of folders or files is made in step S601, the content sync service module 401a creates a log file 403a within the RAM 202 or external storage device 206 in step S604. At this time, the log file 403a records nothing.

In step S605, the content sync service module 401b creates a map table 402b in each of the SD card 102 and memory 310 within the digital camera 100. At this time, the map table 402b records nothing.

In step S606, the imaging unit 300 captures a new image, and the image processing unit 301, encoding/decoding unit 302, and recording/reproduction unit 303 record an encoded captured image in the memory 310 within the digital camera 100.

In step S607, the content sync service module 401b records, as log information, in the log file 403b, how the processing in step S606 changed the directory structure of the digital camera 100. This recording processing is performed for the log file 403b created in each of the SD card 102 and memory 310 within the digital camera 100.

In step S608, the content sync service module 401b records the image captured in step S606 in the SD card 102. The content sync service module 401b sets the path (DCF) of the captured image recorded in the SD card 102, the CDS URL of the captured image, and the transfer flag (its value is 0) to register them in the map table 402b. This registration processing is performed for the map table 402b created in each of the SD card 102 and memory 310 within the digital camera 100.

Assume that the user pulls out the SD card 102 from the digital camera 100 to connect it to the network storage 101. In this case, in step S609, the content sync control module 400a detects the connection, and notifies the content sync service module 401a of the start of subsequent synchronization processing.

In step S610, the content sync service module 401a refers to the log file 403b recorded in the SD card 102. The content sync service module 401a reflects "the directory structure changed on the digital camera 100 side" recorded in the log file 403b on the directory structure of the external storage device 206 of the network storage 101. That is, the SD card 102 records the content data stored by the digital camera 100 and the directory structure in which the content data is stored. If it is detected that the SD card 102 has been inserted, the content sync service module 401a creates the same directory structure as that recorded in the SD card 102 within the external storage device 206 of the network storage 101.

In step S611, the content sync service module 401a refers to the map table 402b recorded in the SD card 102, and specifies the DCF of a captured image with a transfer flag=0.

In step S612, the content sync service module 401a refers to the DCF specified in step S611, and reads out the captured image from a storage position indicated by a storage path represented by the DCF which has been referred to. The DCF indicates a storage position within the SD card 102, at which the captured image is stored.

In step S613, the content sync service module 401a specifies a storage folder associated with "a storage folder in which the digital camera 100 stores the readout captured image" in the directory structure of the external storage device 206 of the network storage 101. The correspondence between the storage folder within the external storage device 206 and that within the SD card 102 has been stored in the SD card 102 in step S601. The content sync service module 401a registers the readout captured image in the specified storage folder. The storage folder is saved within the external storage device 206.

The content sync service module 401a associates a CDS URL which has been recorded in the SD card 102 as the CDS URL of the captured image with the specified storage folder, and registers them in the map table 402a together with a transfer flag (=1).

In step S614, the content sync service module 401a reads out the log file 403b recorded in the SD card 102, and reflects it on the log file 403a. Furthermore, the content sync service module 401a reads out the log file 403a, and reflects it on the log file 403b.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-268367, filed Dec. 7, 2011, which is hereby incorporated by reference herein in its entirety.

What is claimed is:

1. A storage control apparatus for storing content data acquired from a portable storage medium in a storage unit, comprising:

a communication unit which communicates with another apparatus to set a correspondence between a storage location within the portable storage medium and a storage location within the storage unit;

a connection unit which connects the portable storage medium; and a change unit which changes a structure of the storage unit for storing data in accordance with a change history which is stored in the portable storage medium and indicates changes in the portable storage medium.

2. The apparatus according to claim 1, further comprising a storage control unit which stores, in the portable storage medium, a change record of the content data within the storage unit.

3. The apparatus according to claim 1, wherein the change history is updated in response to adding the content data to the portable storage medium.

4. The apparatus according to claim 1, wherein said change unit comprises:
an acquisition unit which acquires, among content data within the portable storage medium, content data to be stored in the storage unit; and
a storage control unit which stores the content data acquired from the portable storage medium by said acquisition unit in a storage location within the storage unit corresponding to a storage location within the portable storage medium, in which the acquired content data is stored, based on the correspondence between the storage location within the portable storage medium and the storage location within the storage unit.

5. The apparatus according to claim 4, wherein based on a setting result of the correspondence stored in the portable storage medium, said storage control unit stores the content data acquired from the portable storage medium in the storage location within the storage unit.

6. The apparatus according to claim 4, wherein:
said change unit changes a structure of the storage location within the storage unit according to the change history which is stored in the portable storage medium and indicates changes in a structure of the storage location within the portable storage medium.

7. The apparatus according to claim 4, wherein based on data which is stored in the portable storage medium and indicates whether content data within the portable storage medium has been read out, said acquisition unit acquires content data which has not been read out.

8. The apparatus according to claim 1, wherein said communication unit communicates with the other apparatus to set the correspondence which is used for synchronizing in a UPnP content directory service which is provided by the storage control apparatus and the other apparatus.

9. A storage method for a storage control apparatus to which a portable storage medium is connectable, and which stores content data acquired from the portable storage medium in a storage unit, the method comprising:
a communication step of communicating with another apparatus to set a correspondence between a storage location within the portable storage medium and a storage location within the storage unit; and
a changing step of changing a structure of the storage unit for storing data in accordance with a change history which is stored in the portable storage medium and indicates changes in the portable storage medium.

10. The method according to claim 9, further comprising a storage control step of storing, in the portable storage medium, a change record of the content data within the storage unit.

11. The method according to claim 9, wherein the change history is updated in response to adding the content data to the portable storage medium.

12. The method according to claim 9, wherein said changing step comprises:
an acquisition step of acquiring, among content data within the portable storage medium, content data to be stored in the storage unit; and
a storage control step of storing the content data acquired from the portable storage medium in said acquisition step in a storage location within the storage unit corresponding to a storage location within the portable storage medium, in which the acquired content data is stored, based on the correspondence between the storage location within the portable storage medium and the storage location within the storage unit.

13. The method according to claim 12, wherein in the storage control step, the content data acquired from the portable storage medium is stored in the storage location within the storage unit based on a setting result of the correspondence stored in the portable storage medium.

14. The method according to claim 12, wherein:
said changing step changes a structure of the storage location within the storage unit according to the change history which is stored in the portable storage medium and indicates changes in a structure of the storage location within the portable storage medium.

15. The method according to claim 12, wherein in the acquisition step, content data which has not been read out is acquired based on data which is stored in the portable storage medium and indicates whether content data within the portable storage medium has been read out.

16. The apparatus according to claim 9, wherein in the communication step, the communication with the other apparatus is made to set the correspondence which is used for synchronizing in a UPnP content directory service which is provided by the storage control apparatus and the other apparatus.

17. A non-transitory storage medium storing a computer program for causing a computer, to which a portable storage medium is connectable, to store content data acquired from the portable storage medium in a storage unit, the program comprising
a communication step of communicating with another apparatus to set a correspondence between a storage location within the portable storage medium and a storage location within the storage unit; and
a changing step of changing a structure of the storage unit for storing data in accordance with a change history which is stored in the portable storage medium and indicates changes in the portable storage medium.

18. The non-transitory storage medium according to claim 17, wherein the program further comprises a storage control step of storing, in the portable storage medium, a change record of the content data within the storage unit.

19. The non-transitory storage medium according to claim 17, wherein the change history is updated in response to adding the content data to the portable storage medium.

20. The non-transitory storage medium according to claim 17, wherein said changing step comprises:
an acquisition step of acquiring, among content data within the portable storage medium, content data to be stored in the storage unit; and
a storage control step of storing the content data acquired from the portable storage medium in said acquisition step in a storage location within the storage unit corresponding to a storage location within the portable storage medium, in which the acquired content data is stored, based on the correspondence between the storage location within the portable storage medium and the storage location within the storage unit.

21. The non-transitory storage medium according to claim 20, wherein in the storage control step, the content data acquired from the portable storage medium is stored in the storage location within the storage unit based on a setting result of the correspondence stored in the portable storage medium.

22. The non-transitory storage medium according to claim 20, wherein the said changing step changes a structure of the storage location within the storage unit according to the change history which is stored in the portable storage medium and indicates changes in a structure of the storage location within the portable storage medium.

23. The non-transitory storage medium according to claim 20, wherein in the acquisition step, content data which has not been read out is acquired based on data which is stored in the portable storage medium and indicates whether content data within the portable storage medium has been read out.

24. The non-transitory storage medium according to claim 17, wherein in the communication step, the communication with the other apparatus is made to set the correspondence which is used for synchronizing in a UPnP content directory service which is provided by the storage control apparatus and the other apparatus.

* * * * *